United States Patent [19]

Shimada et al.

[11] 4,334,747
[45] Jun. 15, 1982

[54] DEVICE FOR PREVENTING SPRING-BACK OF SHUTTER BLADE

[75] Inventors: Fumio Shimada; Teiji Hashimoto, both of Kawasaki, Japan

[73] Assignees: Canon Kabushiki Kaisha, Tokyo; Canon Denshi Kabushiki Kaisha, Saitama, both of Japan; part interest to each

[21] Appl. No.: 280,996

[22] Filed: Jul. 6, 1981

[30] Foreign Application Priority Data

Jul. 7, 1980 [JP] Japan .................................. 55-92893

[51] Int. Cl.³ ...................... G03B 15/03; G03B 13/02; G03B 9/08
[52] U.S. Cl. ................................... 354/147; 354/246; 354/252
[58] Field of Search .............................. 354/245–249, 354/252, 139, 147, 149

[56] References Cited

U.S. PATENT DOCUMENTS

| 3,974,511 | 8/1976 | Matsumoto | 354/147 |
| 4,023,192 | 5/1977 | Simon et al. | 354/147 |
| 4,024,550 | 5/1977 | Yazaki et al. | 354/147 |
| 4,201,459 | 5/1980 | Nakano | 354/147 |

Primary Examiner—Donald A. Griffin
Attorney, Agent, or Firm—Toren, McGeady & Stanger

[57] ABSTRACT

A device for preventing spring-back of the shutter blade of a camera wherein a plate spring projecting into the moving field of a shutter operation is provided with the motion of the shutter operation member being braked at its end phase by the plate spring and being anchored by the plate spring in order to prevent spring-back, while at the same time, a switch of an electrical circuit of the camera is operated by means of a second plate spring.

2 Claims, 6 Drawing Figures

DEVICE FOR PREVENTING SPRING-BACK OF SHUTTER BLADE

FIELD OF THE INVENTION

The present invention relates to a device for preventing spring-back of the shutter blade of a camera.

BACKGROUND OF THE INVENTION

In the case of a focal plane shutter the shutter blade may operate with such a high speed that there arises a danger that at the end of its movement the shutter blade may strike a limiting member and spring back into the camera aperture thus causing irregular exposure at the end of the picture. In order to avoid this, until now the shutter member has been braked at the end of its movement or it has been anchored in position in order to prevent spring-back.

Furthermore, it has been found necessary at the end of the operation of the shutter blade to operate the contacts of the electrical circuit such as the X contact for operating the speed light device in synchronization with the total opening of the leading shutter blade or the trailing shutter blade signal switch for detecting the termination of the operation of the trailing shutter blade so as to control the winding motor.

Such contacts and the cams for operating the contacts are provided separately from the spring-back prevention means so that the number of the parts is necessarily large and their structure is significantly complicated.

SUMMARY OF THE INVENTION

In accordance with the present invention by means of one shutter member the spring-back is prevented and the opening and the closing of the electrical contacts are carried out, while the above-mentioned shutter member acts upon one conductive spring member in such a manner that by means of a remarkably simple construction a spring-back prevention device serving at the same time as the opening and closing device for the electrical contacts can be obtained.

Below, the present invention will be explained in detail in accordance with the drawings of the embodiment.

DESCRIPTION OF THE PREFERRED EMBODIMENT

Figure 1:
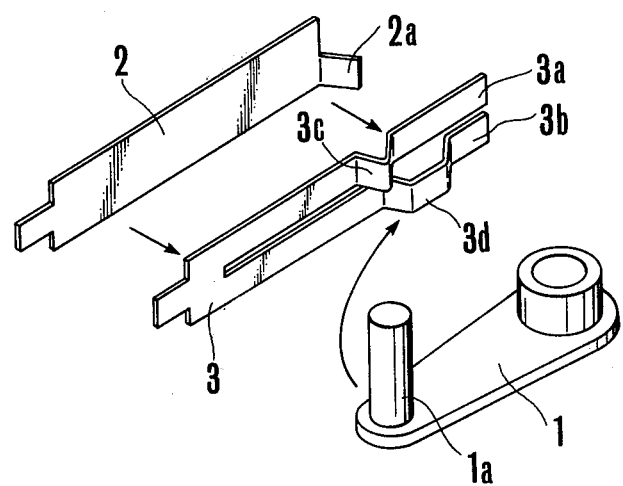
FIG. 1 shows the important parts of the device of the invention in perspective view.

FIG. 1 shows the important parts of an embodiment in accordance with the invention wherein 1 is the operation member to be rotated in operative engagement with the running of the shutter blade shown in the charged state of the shutter.

1a is an insulation pin secured on the member 1. 2 is the fixed conductive contact, and 3 is the movable contact facing the fixed contact 2 with a certain determined distance, consisting of an elastic metal sheet such as of phosphor bronze. The base part of the movable contact is secured in the insulated state from the fixed contact.

A movable contact 3 which is fork-shaped, including a first contact 3a and a second contact 3b, whereby the contacts 3a and 3b include projections 3c and 3d projecting into the rotation path of the pin 1a. A fixed contact 2 includes a bent portion 2a at its end arranged such that when the movable contact is pushed the bent portion 2a is brought into contact only with the end of the second contact 3b to be in conductive engagement with the contact 3b.

Figure 2A:
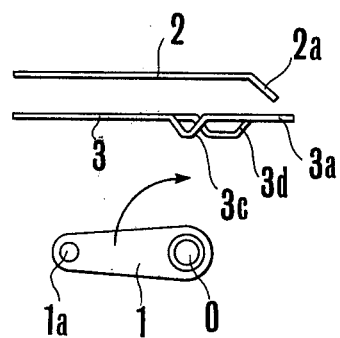
FIGS. 2a, 2b, 2c, and 2d show the stages of operations in plan view.
Figure 2B:
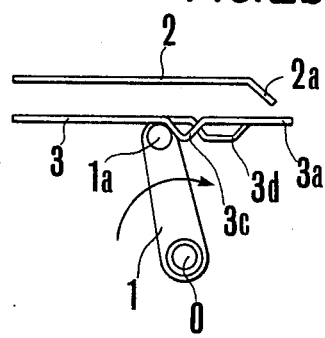
Figure 2C:
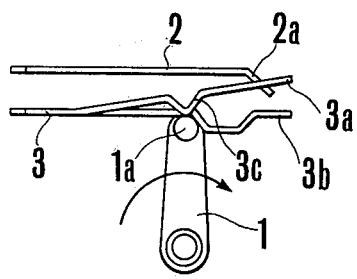
Figure 2D:
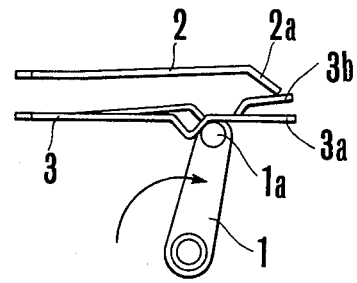

In FIGS. 2(a)–(d) various stages of the operation are shown. FIG. 2(a) shows the state corresponding to that shown in FIG. 1. When the shutter blade starts to run out of this state the operation member 1 starts to run around the shaft O until the pin 1a is brought into contact with the projection 3c of the first contact 3a as is shown in FIG. 2(b). The pin 1a pushes the projection 3c so as to bend the first contact 3a and continues to rotate further against the elasticity of the contact 3a. When the pin 1a moves over the projection 3c, the projection 3d of the second contact 3b is brought into contact with the pin 1a as is shown in FIG. 2(c) in such a manner that the pin 1a is braked with the second contact 3b. Almost at the same time when the pin 1a moves over the projection 3c, it also moves up the projection 3d so as to bend the second contact 3b, whose end is brought into contact with the end 2a of the fixed contact 2, whereby the running of the shutter blade is terminated almost at the same time. At this time, as is shown in FIG. 2(d), the pin 1a is braked with the projection 3d, being in contact with it, whereby the projection 3c is in the running path of the pin 1a, resuming the initial position so that the spring-back of the projection 3d due to the collision with the shutter blade or the operation member 1 can be avoided with the projection 3c.

Figure 3:
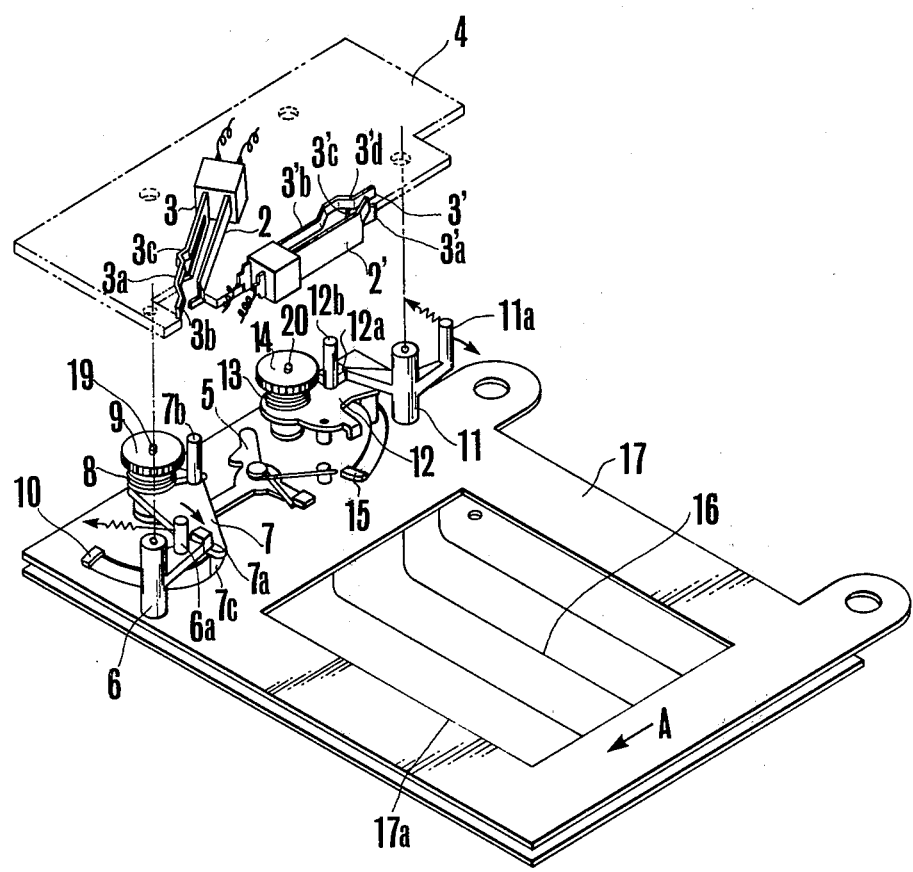
FIG. 3 shows the device built-in the shutter in perspective view.

FIG. 3 shows a focal plane shutter provided with the above device in perspective view. A base plate 4 shown in two dot dash line in the drawing has a shutter control magnet mounted, thereon and is secured on the shutter blade base plate 17 with a certain determined distance, whereby on the lower surface the fixed and the movable contact as mentioned above are held.

7 is the leading shutter blade driving lever corresponding to the above-mentioned operation member, being rotatably borne around the shaft 19 secured on the base plate 17 and connected to the leading shutter blade driving arm not shown in the drawing with the pin 7c. 16 is the leading shutter blade consisting of a plural number of blades, which are linked with the above-mentioned driving arm and the auxiliary arm not shown in the drawing so as to travel along with the rotation of the driving lever 7.

10 is the stopper for the pin 7c.

8 is the leading shutter blade driving spring and 9 is the ratchet gear for anchoring the one end of the spring so as to adjust the driving torque, being anchored with a claw not shown in the drawing. 6 is the leading shutter blade anchoring lever, being rotatably borne on the base plate 17, whereby the end is engaged with the projection 7a of the leading shutter blade driving lever 7 so as to anchor the leading shutter blade in the charged position. 5 is the charge lever operatively engaged with the charge mechanism of the camera so as to rotate the driving lever. 11 is the trailing shutter blade anchoring lever, 12 is the trailing shutter blade driving lever rotatable around the shaft 20, 13 is the trailing shutter blade driving spring and 14 is the ratchet gear, whereby all of the above elements are constructed in the same way as in case of those for the leading shutter blade.

The fixed contact 2 and the movable contact 3 are arranged in the same positional relation as is shown in FIGS. 1 and 2, while the projections 3c and 3d of the contacts are in the neighborhood of the end of the rotation path of the pin 7b provided on the leading shutter blade driving lever 7. The contacts 2 and 3 constitute the X contact for the speed light.

2' and 3' are the fixed and the movable contacts for the trailing shutter blade, whereby in the same way as in case of the contact for the leading shutter blade the movable contact 3' has the first contact 3'a and the second contact 3'b, each presenting a projection 3'c and 3'd arranged at the end of the rotation path of the pin 12a on the trailing shutter blade driving lever 12. The contacts 2' and 3' constitute a switch for producing a signal of the termination of the running of the trailing shutter blade.

FIG. 3 shows the charged state of the shutter. When a current is supplied to the magnet not shown in the drawing in this state, the pin 6a of the leading shutter blade anchoring lever 6 is moved along the direction of the arrow so as to rotate the anchor lever 6 along the clockwise direction. Thus, the projection 7a of the driving lever 7 is released, while the driving lever 7 is rotated by the spring 8 along the clockwise direction so as to allow the leading shutter blade to run along the direction of the arrow A and start the exposure. When the slit forming edge of the leading shutter blade is positioned close to the aperture 17a, the pin 7b of the driving lever is in contact with the projection of the first movable contact, whereby the leading shutter blade driving lever 7 starts to be braked. When the slit forming edge has run out of the aperture, the state shown in FIG. 2(d) is reached, whereby the end of the second contact 3b is in contact with the end 2a of the fixed contact so as to close the synchronization contact. At the same time, the projection 3c prevents the return of the pin 7b so as to prevent the spring back of the leading shutter blade.

When a current is supplied to the trailing shutter blade control magnet after the lapse of a certain determined time after the start of the leading shutter blade and the trailing shutter blade anchoring lever 11 is rotated along the direction of the arrow so as to disengage the trailing shutter blade driving lever from the projection 12a, the driving lever 12 is rotated along the clockwise direction by means of the spring 13 so as to allow the trailing shutter blade to start to run. At the end of the running the pin 12b of the driving lever 12 pushes the projection 3'c of the first movable contact 3'a, being in contact therewith and then the projection 3'd of the second movable contact 3'b so as to be braked in the same way as in case of the leading shutter blade, whereby it is prevented from springing back. At this time, the end of the second movable contact 3'b is brought into contact with the end of the fixed contact 2 so as to produce the signal for the termination of the running of the trailing shutter blade.

In accordance with the present invention, as explained above, by means of an operation member operating together with the leading shutter blade the braking of the shutter blade, the prevention of spring-back and the opening and the closing of the electrical circuit can be carried out, while the contacts constituting the switch for the above circuit can be made use of also for braking the shutter blade and the spring-back, which contributes to the realization of a remarkably simple construction of the shutter.

While specific embodiments of the invention have been shown and described in detail to illustrate the application of the inventive principles, it will be understood that the invention may be embodied otherwise without departing from such principles.

What is claimed is:

1. A device for a camera for preventing spring-back of the shutter blade of a camera shutter having a shutter operation member connected to the shutter blade so as to make the shutter blade run for exposure within a certain determined field, comprising:

first and second conductive plate springs, said springs being arranged in the neighborhood of the motion path of the shutter operation field and each including a projection engageable with the operation member; and a fixed contact, said contact being arranged so as to be brought in contact with the second plate spring and forming a switch for the electrical circuit of the camera together with the plate spring;

whereby in synchronization with its motion during exposure the shutter operation member pushes the projection of the first plate spring and then the projection of the second plate spring so as to be braked, while at the end of the motion spring-back is prevented by means of the first plate spring, when the shutter operation member operates the switch through the second plate spring.

2. A device according to claim 1, wherein a base portion of said first conductive plate spring and a base portion of said second conductive plate spring are connected to each other to constitute one plate member.

* * * * *